(12) United States Patent
Hansen et al.

(10) Patent No.: US 6,432,009 B1
(45) Date of Patent: Aug. 13, 2002

(54) CONTINUOUSLY VARIABLE TRANSMISSION

(75) Inventors: Kyle L. Hansen, Provo; Larry L. Howell, Orem, both of UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 09/130,276

(22) Filed: Aug. 6, 1998

(51) Int. Cl.$^7$ .............................. F16H 59/00; F16H 7/00
(52) U.S. Cl. ........................... 474/49; 474/57; 474/148; 474/50
(58) Field of Search .................................. 74/594.2, 337; 474/57, 58, 50, 49, 48, 47, 56, 148; 280/214

(56) References Cited

U.S. PATENT DOCUMENTS

| 382,079 A | 5/1888 | Ewart |
| 616,630 A | 12/1898 | Pratt |
| 639,256 A | 12/1899 | Lucas |

(List continued on next page.)

FOREIGN PATENT DOCUMENTS

| DE | 148485 | 4/1903 |
| DE | 2418436 | 10/1975 |
| FR | 779702 | 4/1935 |
| GB | 24535 | 12/1899 |
| GB | 270547 | 9/1926 |
| IT | 447879 | 11/1948 |
| JP | 4-95645 | 3/1992 |
| NL | 139750 | 2/1967 |
| SE | 121433 | 4/1948 |
| SU | 977881 | 2/1979 |

OTHER PUBLICATIONS

Scientific–American, Apr. 19, 1902, p. 27.

*Primary Examiner*—David A. Bucci
*Assistant Examiner*—Marcus Charles
(74) *Attorney, Agent, or Firm*—Workman, Nydegger & Seeley

(57) ABSTRACT

A continuously variable transmission that comprises an input shaft to which torque may be applied, an adjustable gearing mechanism, and a driven element. The adjustable gearing mechanism is attached to the input shaft and is configured to continuously vary the drive ratio in response to the applied torque transmitted through the input shaft. The adjustable gearing mechanism includes a hub operatively connected to said input shaft, resilient arms, and an engaging portion. The resilient arms are attached to the hub. In one embodiment of a continuously variable transmission, the hub and the plurality of resilient arms are integrally formed so as to form a one-piece member. The resilient arms are configured to continuously adjust the outer diameter formed by the resilient arms. The engaging portion is integral with each of the resilient arms and is configured to cooperate with an endless member such as a chain. The driven element is operably connected to said gearing mechanism by the endless member. The gearing mechanism comprises material selected from a group consisting of plastic, composites, reinforced elastomers, and metals and alloys thereof. In a preferred embodiment, gearing mechanism comprises plastic. An alternate embodiment of the present invention is disclosed in which the arms are rotatably attached to said hub. This embodiment of a continuously variable transmission also includes linear springs configured to urge the arms to resist the torque exerted thereon.

26 Claims, 2 Drawing Sheets

U.S. PATENT DOCUMENTS

| | | |
|---|---|---|
| 663,928 A | 12/1900 | Pratt |
| 698,854 A | 4/1902 | Pratt |
| 721,394 A | 2/1903 | Rottenburg |
| 771,006 A | 9/1904 | Giraud |
| 789,136 A | 5/1905 | Barber |
| 809,845 A | 1/1906 | Rosewarne |
| 980,847 A | 1/1911 | Steinle |
| 1,092,098 A | 3/1914 | Fitzgerald |
| 1,254,261 A | 1/1918 | Muller |
| 1,446,294 A | 2/1923 | Healey |
| 1,663,414 A | 3/1928 | Mize |
| 1,714,221 A | 5/1929 | Hibbard |
| 2,000,834 A | 5/1935 | Frick .......................... 74/230.1 |
| 2,004,224 A | 6/1935 | Silber ...................... 74/242.22 |
| 2,418,436 A | 4/1947 | Talbot ........................ 116/114 |
| 2,464,635 A | 3/1949 | Cunningham ................ 74/217 |
| 2,584,447 A | 2/1952 | Hayot .......................... 74/217 |
| 2,603,978 A | 7/1952 | Gaisset ................... 74/230.22 |
| 3,005,619 A | 10/1961 | Bowen ...................... 254/50.3 |
| 3,867,851 A | 2/1975 | Gregory et al. ............... 74/244 |
| 3,935,751 A | 2/1976 | Lee ........................ 74/230.18 |
| 3,956,944 A | 5/1976 | Tompkins .................... 74/244 |
| 3,969,948 A | 7/1976 | Pipenhagen, Jr. ............ 74/244 |
| 4,030,373 A * | 6/1977 | Leonard .................... 474/49 X |
| 4,260,386 A | 4/1981 | Frohardt ....................... 474/72 |
| 4,289,489 A | 9/1981 | Moschetto ................... 474/52 |
| 4,342,559 A | 8/1982 | Williams ...................... 474/50 |
| 4,373,926 A | 2/1983 | Fullerton ..................... 474/57 |
| 4,608,034 A | 8/1986 | Reswick ....................... 474/49 |
| 4,618,331 A | 10/1986 | Deal ........................... 474/49 |
| 4,642,070 A | 2/1987 | Walker ........................ 474/57 |
| 4,671,783 A | 6/1987 | Seymour .................... 474/148 |
| 4,684,358 A | 8/1987 | Vahabzadeh ................ 474/148 |
| 4,740,190 A | 4/1988 | Pike ........................... 474/49 |
| 4,759,739 A | 7/1988 | Weir ........................... 474/49 |
| 4,781,663 A | 11/1988 | Reswick ....................... 474/49 |
| 4,836,046 A | 6/1989 | Chappel .................... 74/594.2 |
| 4,892,507 A * | 1/1990 | Patin et al. ............... 474/54 X |
| 4,961,719 A | 10/1990 | Wildermuth ................. 474/50 |
| 5,013,284 A * | 5/1991 | Leonard .................... 474/49 X |
| 5,407,395 A * | 4/1995 | Kramer ....................... 474/49 |
| 5,476,422 A | 12/1995 | Schendel ..................... 474/49 |
| 5,582,555 A | 12/1996 | Miller ......................... 474/49 |
| 5,688,199 A | 11/1997 | Spirig ....................... 474/49.1 |
| 5,772,546 A * | 6/1998 | Warszewski ................. 474/50 |

\* cited by examiner

CONTINUOUSLY VARIABLE TRANSMISSION

BACKGROUND OF THE INVENTION

1. The Field of the Invention

The present invention relates to a continuously variable transmission that is used to transmit torque between a power source, such as an engine or a person, and an output shaft. The speed of the output shaft varies automatically in response to the torque that is applied to an input shaft such that an infinite number of speeds between minimum and maximum are available. In particular, the present invention relates to a continuously variable transmission of a type that is suitable for use on bicycles, wherein the working diameter of the bicycle gearing mechanism is increased or decreased in response to variations in the amount of torque applied to the pedals by the rider.

2. Relevant Technology

Transmissions traditionally are used to couple a power source such as a motor to the drive train of a system or the wheels of the automobile or bicycle. Transmissions perform a gearing up or down function between the power source, such as an input shaft, and the driven member, such as an output shaft, by varying the relative rotation between the two. The relative rotation between the input shaft and the output shaft is varied through a series of ratios or gears. Previous designs of automatic transmissions have been complex arrangements that include torque converters and gears which cause the transmission to shift between a few preselected drive ratios at predetermined points. Usually, these points are clearly defined occurrences.

One application for a continuously variable transmissions has been on low horsepower devices such as bicycles, golf carts, machine tools, and wheelchairs. In general, a continuously variable transmission can be used on any machine or vehicle that is required to deliver varying torques at varying speeds. Continuously variable transmissions have also been utilized with a pulley and belt system or chain engaging surfaces that expand and contract radially.

Attempts have been repeatedly made to incorporate a continuously variable transmission on bicycles. The automatic transmission takes the place of the derailleurs. The continuously variable transmission changes the output speed ratio in accordance with the load encountered as the cyclist rides the bicycle. One problem with existing continuously variable transmissions that have been used on bicycles and include an expanding pulley or gear is that the transmission does not provide a large change in the speed ratio between the minimum value and the maximum value. In general, the existing devices that are to be used on bicycles are complex and require assembly of a large number of parts.

Some continuously variable transmissions that have been specifically designed for bicycles have utilized a gear sprocket that is configured to be able to vary its effective diameter as the chain engaging elements of the gear sprocket moves positively inward and outward. As the circumferential distance between the chain engaging elements of the gear sprocket changes, however, problems arise in keeping the chain in mesh with the elements. One attempt to address this problem has been to incorporate the use of a gear sprocket with a plurality of smaller individual sprockets mounted thereon. Each of the added sprocket wheels engage the chain. In addition, in some cases the smaller sprockets may include a one-way clutch to allow rotation of the smaller sprockets in one direction while preventing rotation in the driving direction. Other designs utilize only one sprocket wheel along with a chain tensioning idle gear. One way of eliminating the need for an idle gear is to incorporate two continuously variable transmissions. One continuously variable transmission is located at the driving source, which on a bicycle is the pedal crank, and the other at the driven member or the rear wheel. This, however, requires a complete modification of the pedal crank assembly as well as modifying the rear wheel of assembly. In fact, nearly all the available continuously variable transmissions require a complete modification of at least the front derailleur system and sometimes the rear derailleur system. As a result, available designs of continuously variable transmissions cannot be quickly and easily mounted on existing bicycles.

Another attempt to utilize a continuous variable transmission on a bicycle includes a spring loaded variable pitch sheave attached to the peddle sprocket. A v-belt couples the variable pitch sheave to a fixed sheave that is connected to the hub of the sprocket of the wheel by another chain. As the pedal torque increases, the v-belt tension is increased and the variable pitch sheave expands which causes the continuously variable transmission to shift automatically. The tension in the belt is maintained, in this case by the variable pitch sheave that has been mounted along side in the glide plate. This in turn changes the center-to-center distance between the variable pitch and the fixed sheave while maintaining a fixed distance between the variable pitch sheave sprocket and the pedal wheel sprocket.

The most popular gearing mechanism utilized on bicycles today includes a front and a rear derailleur system. These systems are complex and tend to require constant adjustment. The designs of the current derailleur systems are also prone to falling out of alignment and require frequent maintenance. In addition, the available designs of derailleurs can be slow to actuate. This slowness results in the rider being caught in the wrong gear. If a sudden increase in torque is applied to the pedals, at worst case the derailleur can become bound up and will not shift. At best case, the derailleur will require the rider to continue to pedal until the derailleur has the time to shift to the desired gear. Current derailleur configurations are actuated with remote step gears to give the rider multiple gears, in most cases twenty-one (21) gears, to choose from. For the novice rider or the leisure rider who wants to take an occasional leisurely ride on the bicycle, the complex system of multiple gears present too many choices and changing gears is too complex.

In addition, most of the derailleurs that are currently available are made up of many individual parts. In general, the current designs of front derailleur systems average approximately 25 to 40 pieces. As a result, current derailleur systems are expensive to manufacture and assemble. In addition, maintaining and adjusting the derailleur systems can be time consuming and expensive. As the complexity of the derailleur systems has increased, they have become unforgiving if they become even slightly out of adjustment.

Finally, there is a strong trend in the bicycle industry to reduce the weight of the bicycle as a whole and in particular of each component group. With the multitude of parts associated with existing derailleur systems, it is important to find ways to reduce the number of components and to cut the weight of the gearing mechanism itself.

SUMMARY AND OBJECTS OF THE INVENTION

It is an object of the present invention to provide a continuously variable transmission that is efficient and inexpensive to manufacture.

Another object of the present invention is to provide a continuously variable transmission that has a minimal number of parts.

Another object of the present invention to provide a simple, easy to use gear mechanism that automatically responds to various amounts of torque acting on the input shaft.

A further object of the present invention to provide a continuously variable transmission which is substantially a unitary member.

Yet another object of the present invention to provide a continuously variable transmission that can be incorporated into existing bicycles without requiring substantial modifications.

A further object of the present invention to provide a continuously variable transmission for use on a bicycle in which the working diameter of the gearing mechanism is increased or decreased in response to various amounts of torque being applied to the pedals by the rider.

These and other objects and features of the present invention will become more fully apparent from the following description and appended claims, or may be learned by the practice of the invention as set forth hereinafter.

To achieve the foregoing objects, and in accordance with the invention as embodied and broadly described herein, the present invention relates to a continuously variable transmission that comprises an input shaft to which torque may be applied, an adjustable gearing mechanism, and a driven element. The adjustable gearing mechanism is attached to the input shaft and is configured to continuously vary the drive ratio in response to the applied torque transmitted through the input shaft. The adjustable gearing mechanism includes a hub operatively connected to said input shaft, resilient arms, and an engaging portion. The resilient arms are attached to the hub. In one embodiment of a gearing mechanism, the hub and the plurality of resilient arms are integrally formed so as to form a one-piece member. The resilient arms are configured to continuously adjust the outer diameter formed by the resilient arms, thereby varying the drive ratio in response to the torque transmitted through the input shaft. The engaging portion is integral with each of the resilient arms and is configured to cooperate with an endless member such as a chain. The driven element is operably connected to said gearing mechanism by the chain. The gearing mechanism comprises material selected from a group consisting of plastic, composites including graphite fibers and fiberglass, reinforced elastomers, and metals and alloys thereof. In a preferred embodiment, the gearing mechanism comprises a plastic material.

An alternate embodiment of the present invention is disclosed in which the arms are movably attached to the hub. The arms comprise material selected from a group consisting of plastic, composites including graphite fibers and fiberglass, reinforced elastomers, and metals and alloys thereof. This embodiment of a continuously variable transmission also includes springs configured to urge the arms to resist the torque acting on the gearing mechanism.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to a continuously variable transmission that is used to transmit torque between an input shaft driven by a power source and an output shaft. One application, by way of example and not limitation, for such a continuously variable transmission is on a bicycle. The working diameter of the continuously variable transmission is increased or decreased in response to variations in the torque applied to the input shaft. The speed of the output shaft varies automatically in response to the torque that is applied to an input shaft such that an infinite number of speeds between minimum and maximum are available. It can be appreciated that the continuously variable transmission has broad applications other than on bicycles.

Figure 1:
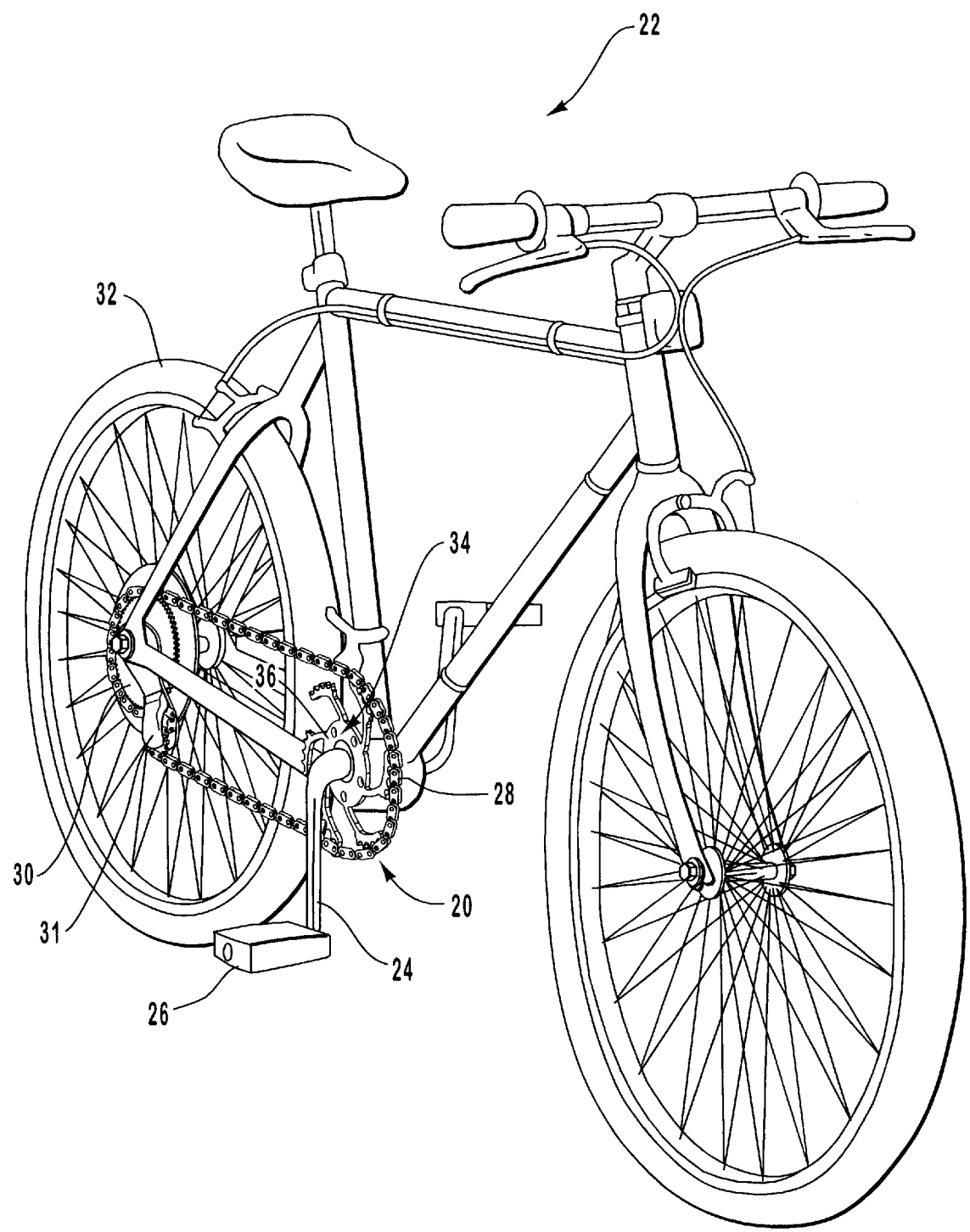
FIG. 1 is a perspective view of one embodiment of a continuously variable transmission mounted on a conventional mountain bike.

FIG. 1 illustrates one embodiment of a continuously variable transmission 20 mounted on a conventional bicycle 22. Continuously variable transmission 20 is configured to continuously vary the drive ratio in response to the applied torque transmitted through an input shaft, such as by way of example, crank 24. Bicycle 22 includes a pair of cranks 24 each having a pedal 26 attached to the remote end thereof. An endless member, such as chain 28, runs over an output shaft, which in this embodiment is in the form of a rear sprocket 30, and around continuously variable transmission 20. It can be appreciated that the endless member may have various other configurations such as a v-belt, a timing belt, or a conventional belt.

Continuously variable transmission 20 is mounted using conventional methods to rotate on the frame of bicycle 22. Output shaft or sprocket 30 is connected to a rear wheel 32 of bicycle 22. In operation, the torque that is exerted on cranks 24 by the rider of bicycle 22 is translated by continuously variable transmission 20 through chain 28 to sprocket 30 to power bicycle 22. Attached to sprocket 30 is a tensioning element 31 which adjusts its position in response to the forces in chain 28. Tensioning element 31 is configured to take up any slack in chain 28 resulting from the increased torque acting on continuously variable transmission 20 and changing the diameter thereof as will be discussed below.

Although sprocket 30 is depicted as having only one gear ring, it can be readily appreciated by those skilled in the art that continuously variable transmission 20 can be utilized with traditional rear sprockets and/or rear derailleur systems. As a result of this configuration, an increased number of gears would be available for use with continuously variable transmission 20. In both cases, tensioning element 31 would be used to pick up the slack in chain 28. If a multi-gear sprocket is used, such as one with a current rear derailleur, tensioning element 31 would also be able to move chain 28 between the various gears.

Figure 2:
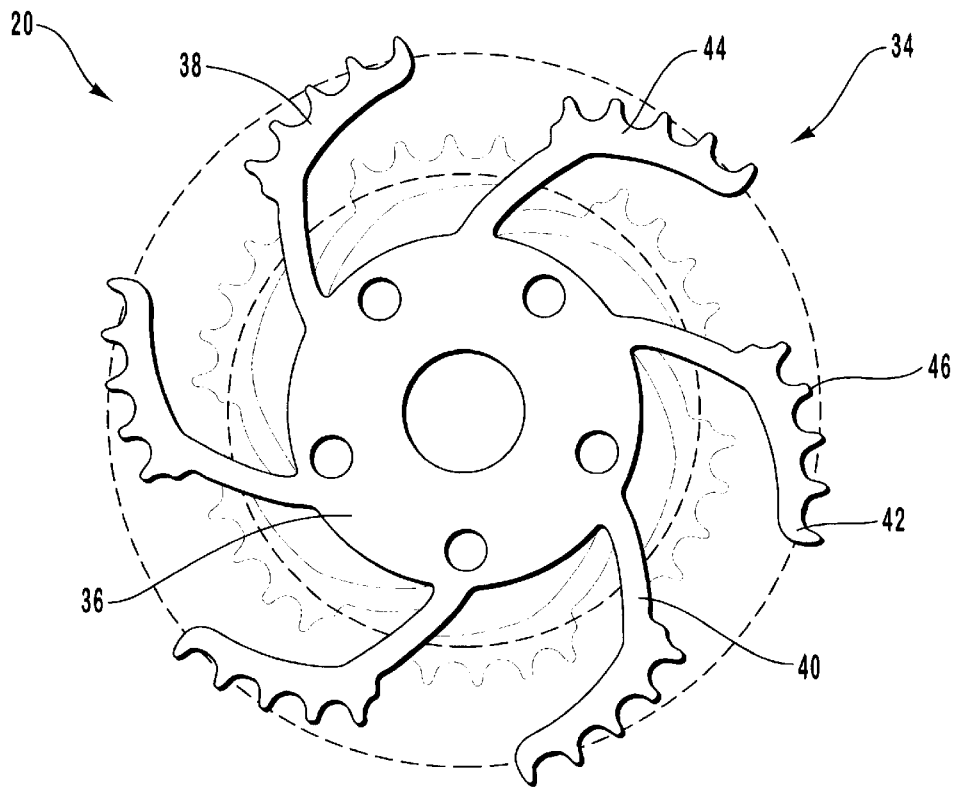
FIG. 2 illustrates the gearing mechanism of the continuously variable transmission depicted in FIG. 1.

Continuously variable transmission 20 comprises a gearing mechanism 34 whose effective radius is variable in a stepless manner. One embodiment of gearing mechanism 34 is illustrated in further detail in FIG. 2. Gearing mechanism 34 comprises a hub 36 which is rotatably mounted to bicycle 20 as depicted in FIG. 1. Hub 36 is operably connected with input shaft which in this embodiment is crank 24. As illustrated in FIG. 2, hub 36 has several resilient arms 38 attached thereto. Although gearing mechanism 34 is depicted as having six (6) resilient arms 38, it can be appreciated by those skilled in the art that various other numbers of resilient arms 38 can be utilized. The number of resilient arms 38 utilized in gearing mechanism 34 impacts the amount of slippage between gearing mechanism 34 and the endless member such as chain 28 which operably connects the input shaft to the output shaft. In one embodiment of gearing mechanism 34, it is presently preferred that gearing mechanism 34 have six resilient arms 38.

As depicted in one embodiment illustrated in FIG. 2, resilient arms 38 have a substantially curved, arcuate configuration. Resilient arms 38 have been configured to deflect toward hub 36 in response to torque exerted on gearing mechanism 34. Various other configurations of resilient arms 38 may be used. Resilient arms 38 may be more linear or at differing angular relationships with hub 36. Resilient arms 38 each have a proximal end 40 and a distal end 42. Proximal end 40 of each resilient arm 38 is attached to hub 36. In one embodiment illustrated, proximal end 40 is integrally attached to hub 36. In fact, hub 36 and resilient arms 38 are an integral one-piece member. Resilient arms 38 of gearing mechanism 34 are configured to continuously adjust the outer diameter formed by distal end 42 of resilient arm 38, thereby varying the drive ratio of gearing mechanism 34 in response to the torque transmitted through cranks 24. Resilient arms 38 are designed to be flexible in varying degrees proportional to the amount of torque being delivered through cranks 24. The outer diameter formed by distal end 42 of each resilient arm 38 automatically changes as resilient arm 38 radially deflects in response to the torque being exerted upon gearing mechanism 34. FIG. 2 illustrates gearing mechanism 34 with resilient arms 38 in a maximum diameter and in phantom depicts resilient arms 38 in the position resulting in the minimum diameter.

When resilient arms 38 are in the position having the maximum diameter as depicted in FIG. 2, a minimum amount of torque is being applied to cranks 24 through pedals 26 In this position, gearing mechanism 34 has the largest ratio. When resilient arms are deflected to be in the position depicted by phantom lines shown in FIG. 2, a maximum amount of torque is being applied to the gearing mechanism 34. As shown, when gearing mechanism 34 is under a large amount of torque, resilient arms 38 deflect under the load to form a smaller diameter. At this point, gearing mechanism 34 has the smallest ratio. As the torque exerted on gearing mechanism 34 decreases, resilient arms 38 expand back out to the original size. The expanding resilient arms 38 form increasingly larger diameters and thus provide increasing larger ratio for gearing mechanism 34.

It can be appreciated that resilient arms 38 may be at an infinite number of positions between the two extremes in response to the torque exerted upon cranks 24 by the rider of bicycle 22 such that gearing mechanism 34 smoothly and steplessly continuously varies the drive ratio in response to the torque being transmitted through cranks 24. Because the size of gearing mechanism 34 is self-regulated by the amount of torque it is subject to, gearing mechanism 34 essentially becomes an automatic transmission, continuously variable throughout its largest and smallest diameter.

As illustrated, distal end 42 of each resilient arm 38 is configured to cooperate with a looped endless member such as chain 28. Resilient arms 38 have an integral engaging portion 44 formed on distal end 42 of each resilient arm 38. Engaging portion 44 is specifically configured to cooperate with an endless member, such as chain 38. In one embodiment depicted in the figures, engaging portion 44 has teeth 46 configured to mesh with endless member, such as chain 28. It is contemplated that the continuously variable transmission 20 can be used with other types of endless member such as a belt or of a chain-type member having various configurations and shapes of links. Accordingly, engaging portion 44 of distal end 42 of resilient arms 38 would be configured such that the tension element such as chain 28 cooperate.

Gearing mechanism 34 is one embodiment of structure capable of performing the function of an adjustable gearing means for continuously varying the drive ratio in response to the applied torque transmitted through input shaft. Gearing mechanism 34 may be composed of materials such as plastic, composites including graphite fibers and fiberglass, reinforced elastomers, and metals and alloys thereof. Gearing mechanism 34 may also be formed using powder metallurgy technologies. The material selected for gearing mechanism 34 must be sufficiently flexible to deflect in response to the torque being applied to crank 24. In one preferred embodiment, gearing mechanism 34 is composed of a plastic material that was sufficiently flexible to deflect in response to the torque being applied to crank 24, but sufficiently strong for engaging portion 44 to cooperate with chain 24.

It can be appreciated by those skilled in the art that engaging portion 44 will be subject to wear resulting from the cooperation with the endless member such as chain 28. Although the presently preferred material for gear mechanism 34 is plastic, engaging portion 44 may require additional strengthening such as, by way of example only and not limitation, the use of a metal insert about which the plastic is formed. The metal insert and plastic would be integrally formed into a continuous piece. In the alternative, engaging portion 44 could be coated with a wear resistant material, thereby increasing the life of gear mechanism 34. Numerous other conventional methods of increasing the durability of specific portion of a one piece member. For example, engaging portion 44 of distal end 42 of resilient arms 38 can be provided with strengthening materials such as a composite metal to enhance the life of gearing mechanism 34.

Figure 3:
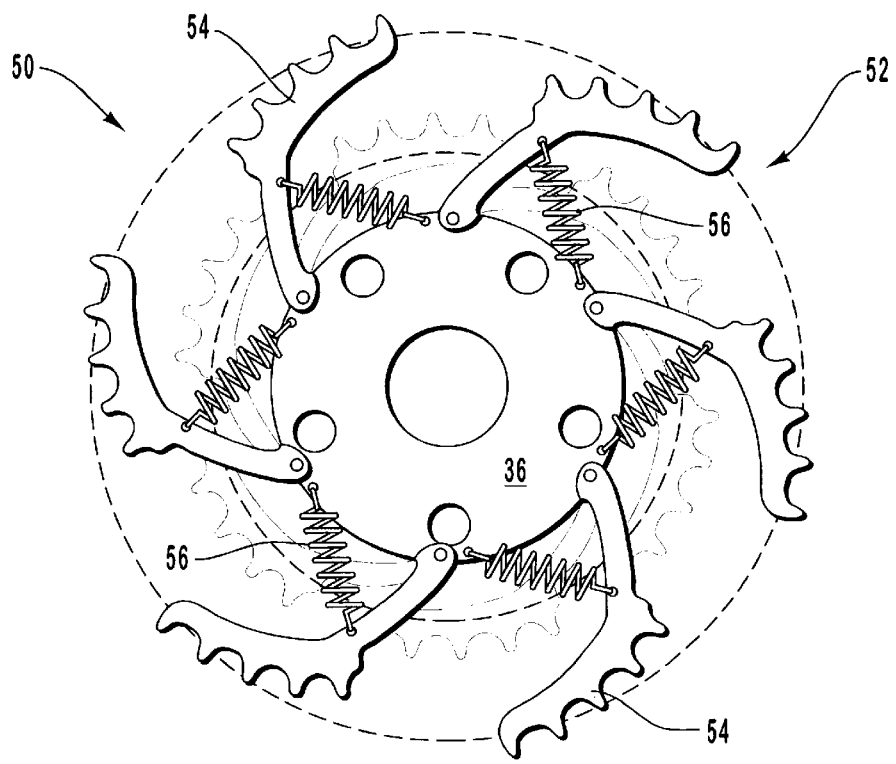
FIG. 3 depicts an alternate embodiment of the gearing mechanism.

FIG. 3 depicts an alternate embodiment of continuously variable transmission 50. The majority of the features previously discussed apply to this embodiment of continuously variable transmission 50. The features that are not effected are identified with the same reference numbers as used in FIGS. 1 and 2. Only those features that have changed will be described in detail.

Continuously variable transmission 50 comprises gearing mechanism 52. As illustrated, gearing mechanism 52 comprises hub 36 which is connected to crank 24 and resilient arms 54. In one embodiment, arms 54 are movably attached to hub 36. Arms 54 may be resilient flexible members or substantially rigid members. Proximal end 40 of arms 54 are rotatably attached to hub 36 such that arms 54 rotate around a pivot point such as a pin in response to varying torque transmitted through cranks 24. In this embodiment, arms 54 are biased away from hub 36 by springs 56. Springs 56 are depicted in FIG. 3 as linear springs. It can be appreciated by those skilled in the art that springs 56 could have various other embodiments.

As illustrated, springs 56 have one end mounted on hub 36 and the opposite end 24 attached to arm 54. It will be appreciated that springs 56 could have various other attachment points and positions relative to hub 36 and arms 54. Springs 56 bias arms 54 away from hub 36 and help arms 54 resist the torque being applied. Springs 56 bias arms 54 outward toward the larger diameter of the gearing mechanism 54, thereby increasing the minimum amount of torque which must be applied to cranks 24 before arms 54 begin to deflect. Springs 56 are configured to resist the torque transmitted through crank 24 to resilient arms 54. It can be appreciated that various types of springs comprising various kinds of materials can be utilized depending on the type, size and weight of the rider. This allows continuously variable transmission 50 to be individualized to work in the range of torque that a particular rider typically exerts on cranks 24.

Springs 56 are one embodiment of structure capable of performing the function of a biasing means for urging arms 54 of gearing mechanism 52 to resist the torque that is transmitted through the input shaft. Various other embodiments of structure are capable of performing the function of a biasing means. Springs 56 could instead of being linear springs be torsional springs. By way of example and not limitation, torsional springs would be mounted at the pivot point of arms 54 to resist the torque acting on arms 54. In addition, another structure that could be utilize to perform the function of such a biasing means are flexible resilient structural members that can be substituted in the position of springs 56.

The embodiment of continuously variable transmission 20 depicted in FIG. 2 is a one-piece member that can be efficiently and inexpensively manufactured. The novel design of continuously variable transmission 50 depicted in FIG. 3 also substantially reduces the number of parts as compared to the currently available continuously variable transmissions. As a result, manufacturing is much simpler and cost effective. In addition, the significant reduction in the number of parts reduces the required maintenance and repairs. Finally, the reduction in parts decreases the weight of continuously variable transmissions 20 and 50 as compared to current derailleur systems. These embodiments of continuously variable transmission 20 and 50 are both configured such that they can be attached to existing bicycle without requiring serious modifications beyond the removal of the front derailleur.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A continuously variable transmission comprising:
   (a) an input shaft to which torque may be applied;
   (b) adjustable gearing means for continuously varying the drive ratio in response to the applied torque transmitted through said input shaft, said adjustable gearing means being attached to said input shaft, said gearing means comprising:
      (i) a hub portion operatively connected to said input shaft;
      (ii) a plurality of elongated, arcuate arm portions having a distal end and a proximal end extending from said hub portion, said plurality of arm portions and said hub portion being a continuous one-piece member, said distal end of each of said plurality of arm portions having teeth formed therein configured to cooperate with an endless member, each of said plurality of arm portions being configured to automatically and continuously adjust the outer diameter formed by said distal end of each of said plurality of arm portions in response to the applied torque transmitted from said input shaft through said hub portion, said plurality of arm portions and said hub portion being substantially coplanar; and
   (c) a driven element operably connected to said hub portion, said driven element and said hub portion being rotatable about respectively associated parallel axes.

2. A continuously variable transmission as recited in claim 1, wherein said plurality of arm portions are resilient flexible members.

3. A continuously variable transmission as recited in claim 1, wherein said plurality of arm portions comprise material selected from the group consisting of plastic, composites, reinforced elastomers, metals, and metal alloys.

4. A continuously variable transmission as recited in claim 1, wherein said hub portion comprises material selected from the group consisting of plastic, composites, reinforced elastomers, metals, and metal alloys.

5. A continuously variable transmission as recited in claim 1, wherein said plurality of arm portions are rotatably attached to said hub portion.

6. A continuously variable transmission as recited in claim 5, wherein said plurality of arm portions are substantially rigid.

7. A continuously variable transmission as recited in claim 1, further comprising a biasing means for urging said plurality of arm portions to resist the torque.

8. A continuously variable transmission as recited in claim 7, wherein said biasing means comprises a plurality of springs.

9. A continuously variable transmission as recited in claim 8, wherein said plurality of springs comprise linear springs, each of said plurality of linear springs having one end attached to said hub portion and an opposite end attached to one of said plurality of arm portions.

10. A continuously variable transmission comprising:
   (a) an input shaft to which torque may be applied;
   (b) adjustable gearing means for continuously varying the drive ratio in response to the applied torque transmitted through said input shaft, said adjustable gearing means being attached to said input shaft, said gearing means comprising:
      (i) a hub portion operatively connected to said input shaft; and
      (ii) a plurality of elongated, arcuate arm portions extending from said hub portion, said plurality of arm portions and said hub portion being an integrally formed one-piece material member, each of said plurality of arm portions having teeth formed therein configured to cooperate with an endless member, said plurality of arm portions being configured to continuously adjust the outer diameter formed by said plurality of arm portions and to maintain a substantially circular path for said endless member to travel around, each of said plurality of arm portions being substantially planar;
   (c) a driven element operably connected to said hub portion, said driven element and said hub portion being rotatable about respectively associated parallel axis; and
   (d) a biasing mechanism to urge said plurality of arm portions to resist the torque, said biasing mechanism comprising a plurality of linear springs, each of said plurality of linear springs having one end attached to said hub portion and an opposite end attached to one of said plurality of arm portions.

11. A continuously variable transmission for a bicycle apparatus comprising:
   (a) an input shaft to which torque may be applied by the rider;
   (b) an adjustable gearing mechanism configured to continuously vary the drive ratio in response to the applied torque transmitted through said input shaft, said adjustable gearing mechanism being attached to said input shaft, said gearing mechanism being a continuous one-piece member comprising:
      (i) a hub portion operatively connected to said input shaft; and
      (ii) a plurality of arm portions having a distal end and a proximal end continuously extending from said hub portion, said distal end of each of said plurality of arm portions having teeth formed therein configured to cooperate with a bicycle chain, said plurality of arm portions being configured to automatically and continuously adjust the outer diameter formed by said distal end of each of said plurality of arm portions in response to the applied torque transmitted from said input shaft through said hub portion, said plurality of arm portions being resilient, flexible members, said plurality of arm portions and said hub portion being substantially coplanar; and
   (c) a driven element operably connected to said hub portion, said driven element and said hub portion being rotatable about respectively associated parallel axes.

12. A continuously variable transmission comprising:
   (a) an input shaft to which torque may be applied;
   (b) adjustable gearing means for continuously varying the drive ratio in response to the applied torque transmitted through said input shaft, said adjustable gearing means being attached to said input shaft, said gearing means comprising:
      (i) a hub portion operatively connected to said input shaft;
      (iii) a plurality of elongated, arcuate arm portions having a distal end and a proximal end extending from said hub portion, said plurality of arm portions and said hub portion are an integrally formed one-piece material member, said distal end of each of said plurality of arm portions having teeth formed therein configured to cooperate with an endless member, each of said plurality of arm portions being configured to automatically and continuously adjust the outer diameter formed by said distal end of each of said plurality of arm portions in response to the applied torque transmitted from said input shaft through said hub portion and to maintain a substantially circular path for said endless member to travel around, each of said plurality of arm portions being substantially planar, said plurality of arm portions and said hub portion being substantially coplanar; and
   (c) a driven element operably connected to said hub portion, said driven element and said hub portion being rotatable about respectively associated parallel axes.

13. A continuously variable transmission comprising:
   (a) an input shaft to which torque may be applied;
   (b) an adjustable gearing mechanism configured to continuously varying the drive ratio in response to the applied torque transmitted through said input shaft, said adjustable gearing mechanism being attached to said input shaft, said adjustable gearing mechanism comprising:
      (i) a hub portion operatively connected to said input shaft;
      (ii) a plurality of resilient arm portions having a distal end and a proximal end continuously formed with said hub portion, said plurality of arm portions and said hub portion being an integrally formed one-piece material member, said distal end of each of said plurality of arm portions having teeth formed therein configured to cooperate with an endless member, each of said plurality of resilient arm portions being configured to automatically and continuously adjust the outer diameter formed by said distal end of each of said plurality of resilient arm portions in response to the applied torque transmitted from said input shaft through said hub portion, said plurality of said arm portions and said hub portions being substantially coplanar; and
   (c) a driven element operably connected to said gearing mechanism by said endless member, said driven element and said gearing mechanism being rotatable about respectively associated parallel axis.

14. A continuously variable transmission as recited in claim 13, wherein said gearing mechanism comprises material selected from the group consisting of plastic, composites, reinforced elastomers, metals, and metal alloys.

15. A continuously valuable transmission as recited in claim 13, wherein said gearing mechanism is substantially comprised of plastic.

16. A continuously variable transmission as recited in claim 13, wherein said endless member comprises a chain.

17. A continuously variable transmission as recited in claim 13, wherein said plurality of resilient arm portions are rotatably attached to said hub portion.

18. A continuously variable transmission as recited in claim 17, wherein said plurality of resilient arm portions comprise material selected from the group consisting of plastic, composites, reinforced elastomers, metals, and metal alloys.

19. A continuously variable transmission as recited in claim 11, further comprising a biasing means for urging said plurality of resilient arm portions to resist said torque.

20. A continuously variable transmission as recited in claim 19, wherein said biasing means comprises a plurality of linear springs, each of said plurality of linear springs having one end attached to said hub portion and an opposite end attached to one of said plurality of resilient arm portions.

21. A continuously variable transmission comprising:
   (a) an input shaft to which torque may be applied;
   (b) a gearing mechanism whose effective radius is variable in a stepless manner, said gearing mechanism being substantially composed of material selected from the group consisting of plastic, composites, reinforced elastomers, metals, and metal alloys, said gearing mechanism comprising:
      (i) a hub portion operatively connected to said input shaft;
      (ii) a plurality of resilient arm portions having a distal end and a proximal end continuously extending from with said hub portion, said plurality of arm portions and said hub portion being an integrally formed one-piece material member, said distal end of each of said plurality of arm portions having teeth formed therein configured to cooperate with an endless member, each of said plurality of resilient arm portions being configured to automatically and continuously adjust the outer diameter formed by said distal end of each of said plurality of resilient arm portions in response to the applied torque transmitted from said input shaft through said hub portion thereby continuously varying the drive ratio, said plurality of arm portion being substantially planar, said plurality of arm portions and said hub portion being at least partially coplanar; and (c) a driven element operably connected to said gearing mechanism, said driven element and said gearing mechanism being rotatable about respectively associated parallel axis.

22. A continuously variable transmission as recited in claim 21, wherein said gearing mechanism substantially comprises a plastic material.

23. A continuously variable transmission as recited in claim 21, wherein:

(a) said endless member comprises a chain; and (b) said teeth are configured to cooperate with said chain.

24. A continuously variable transmission as recited in claim 21, wherein said plurality of resilient arm portions are pivotally attached to said hub portion.

25. A continuously variable transmission as recited in claim 21, further comprising a biasing means for urging said resilient arm portions to resist said torque.

26. A continuously variable transmission as recited in claim 25, wherein said biasing means comprising a plurality of linear springs, one of said plurality of linear springs being attached to one of said plurality of resilient arm portions to urge each of said plurality of resilient arm portions away from said hub portion, each of said plurality of linear springs having one end attached to said hub portion and an opposite end attached to one of said plurality of resilient arm portions.

* * * * *

UNITED STATES PATENT AND TRADEMARK OFFICE
CERTIFICATE OF CORRECTION

PATENT NO.   : 6,432,009 B1
DATED        : August 13, 2002
INVENTOR(S)  : Kyle L. Hansen and Larry L. Howell It is certified that error appears in the above-identified patent and that said Letters Patent is hereby corrected as shown below:

<u>Column 2,</u>
Line 8, delete "of"

<u>Column 3,</u>
Lines 4, 8, 11 and 15, before "to" insert -- is --

<u>Column 5,</u>
Line 4, change "20" to -- 22 --
Line 44, after "26" insert -- . --
Line 55, change "increasing" to -- increasingly --
Line 55, change "ratio" to -- ratios --

<u>Column 6,</u>
Line 8, change "member" to -- members --
Line 9, delete "of"
Line 17, before "input" insert -- the --
Line 67, delete "24"

<u>Column 7,</u>
Line 6, change "54:" to -- 52 --
Line 24, change "utilize" to -- utilized --
Line 40, change "transmission" to -- transmissions --

<u>Column 9,</u>
Line 43, change "(iii)" to -- (ii) --

UNITED STATES PATENT AND TRADEMARK OFFICE
CERTIFICATE OF CORRECTION

PATENT NO. : 6,432,009 B1
DATED : August 13, 2002
INVENTOR(S) : Kyle L. Hansen and Larry L. Howell It is certified that error appears in the above-identified patent and that said Letters Patent is hereby corrected as shown below:

<u>Column 10,</u>
Line 44, change "11" to -- 13 --
Line 63, delete "with"

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,432,009 B1 Page 1 of 1
APPLICATION NO. : 09/130276
DATED : August 13, 2002
INVENTOR(S) : Hansen et al.

It is certified that error appears in the above-identified patent and that said Letters Patent is hereby corrected as shown below:

<u>Column 1</u>
Line 3, add:

--GOVERNMENT LICENSE RIGHTS

This invention was made with government support under Contract CMS 9978737 awarded by National Science Foundation. The government has certain rights in the invention.--.

Signed and Sealed this

Eighth Day of December, 2009

David J. Kappos
*Director of the United States Patent and Trademark Office*